(12) United States Patent
Nedele et al.

(10) Patent No.: US 6,285,276 B1
(45) Date of Patent: Sep. 4, 2001

(54) CONTROL DEVICE FOR AN INDUSTRIAL TRUCK

(75) Inventors: Hartmut Nedele, Metzingen; Pierre Maller, Glattbach; Edgar Weber, Albstadt; Eugen Schöller, Balingen, all of (DE); Frederic Bruder, Senlis (FR)

(73) Assignee: Still & Saxby S.A.R.L. (FR)

( * ) Notice: Subject to any disclaimer, the term of this patent is extended or adjusted under 35 U.S.C. 154(b) by 0 days.

(21) Appl. No.: 09/618,084

(22) Filed: Jul. 17, 2000

Related U.S. Application Data

(63) Continuation of application No. 09/124,440, filed on Jul. 29, 1998, now abandoned.

(30) Foreign Application Priority Data

Jul. 30, 1997 (DE) .............................................. 197 32 888

(51) Int. Cl.$^7$ .................................................. H01C 10/30
(52) U.S. Cl. ................................ 338/160; 338/47; 338/99
(58) Field of Search .............................. 338/160, 47, 99, 338/101, 103, 114

(56) References Cited

U.S. PATENT DOCUMENTS

| | | | |
|---|---|---|---|
| 3,418,850 | 12/1968 | Goddin | 73/141 |
| 4,333,068 | 6/1982 | Kishel | 338/158 |
| 4,421,269 | 12/1983 | Ts'ao | 236/12.12 |
| 4,739,184 | 4/1988 | Onesti | 307/10 R |
| 5,302,936 | 4/1994 | Yaniger | 338/47 |
| 5,334,967 | 8/1994 | Paszkiewicz | 338/95 |
| 5,554,965 | 9/1996 | Sundberg | 338/160 |

FOREIGN PATENT DOCUMENTS

| | | | |
|---|---|---|---|
| 3624166 | 1/1988 | (DE) | H01C/10/06 |
| 4328824 | 3/1995 | (DE) | H01H/13/70 |
| 0894763 | 7/1998 | (EP) | B66F/9/20 |

Primary Examiner—Karl D. Easthom
Assistant Examiner—Kyung S. Lee
(74) Attorney, Agent, or Firm—Webb Ziesenheim Logsdon Orkin & Hanson, P.C.

(57) ABSTRACT

A control device is provided for an industrial truck, in particular the towbar of a towbar-guided industrial truck, having a circuit element to generate a multi-stage electrical control signal. The invention teaches that the switching element has at least one contact membrane (6) which can be electrically connected by a pressure force exerted on the contact membrane (6) with at least one of a plurality of contact points (2) that correspond to the contact membrane (6). The contact points (2) are connected by electrical resistors (R1–8). The electrical resistors (R1–8) are preferably connected in series, whereby the connecting line between each two resistors is connected to a contact point (2). There are two sliders (8a, b), each of which exerts a pressure force on the contact membrane (6), as a result of which a contact point (2) can be connected to a contact area (3).

15 Claims, 1 Drawing Sheet

CONTROL DEVICE FOR AN INDUSTRIAL TRUCK

CROSS-REFERENCE TO RELATED APPLICATION

This is a continuation of application Ser. No. 09/124,440 filed Jul. 29, 1998 now abandonded entitled "Control Device For An Industrial Truck."

BACKGROUND OF THE INVENTION

The invention relates generally to a control device for an industrial truck, in particular the hitch of a towbar-guided industrial truck, with a circuit element for the generation of a multi-stage electrical control signal.

Control devices for industrial trucks are equipped with control elements for the actuation of the various functions of the industrial truck, such as operation of the truck or an associated lifting apparatus. Depending on the function to be controlled, the control elements have circuit elements for the generation of actuation/deactuation control signals in the form of multi-stage or stepless control signals. Multi-stage or stepless control signals are used in particular to control the speed of travel of the industrial truck or to control the speed of raising and lowering a load-carrying device.

Signal generators of the prior art for the generation of multi-stage control signals entail significant effort and expense in terms of design and construction and consist mostly of a plurality of mechanical and electrical components that are subject to wear. A signal generator of the prior art to be used on an industrial truck for the generation of a stepless control signal is described in DE-GM 94 17 201, for example. The circuit element described in that document is realized in the form of a membrane potentiometer and has a resistance track attached to a flexible pin, by means of which it is possible to generate a control signal which is proportional to the distance the control element is moved. The electrical and mechanical components of this signal generator of the prior art are complex and expensive to design and manufacture.

Therefore, it is an object of the invention to make available a control device with a simple, low-wear circuit element for the generation of a stepped control signal.

SUMMARY OF THE INVENTION

The invention teaches that this object can be accomplished by means of a circuit element that has at least one contact membrane. The contact membrane can be connected with at least one of a plurality of contact points adjacent to the contact membrane by a pressure force exerted on the contact membrane. The contact points are connected by electrical resistors. The electrically conducting contact membrane is pressed by means of the pressure force on at least one of the contact points which is located on a circuit board, whereby an electrical connection is created between the contact membrane and the contact point. A specified contact point can be connected with the contact membrane as a function of the point at which the pressure force is applied. This location is defined by the operator who controls the position of the circuit element. Because the various contact points are connected to one another by means of resistors, the total resistance of the circuit element can be defined in specified stages by the operator.

In one advantageous embodiment of the invention, the electrical resistors are connected in series, whereby each connecting line between two resistors is connected with a contact point. The resistors are therefore connected in a series circuit. The contact membrane is connected to a specified connecting line between two resistors as a function of the site at which the pressure force is applied.

It is particularly advantageous if each of the resistors connected in series has the same resistance value. It thereby becomes possible to keep the number of different components to a minimum.

A different type of advantage can be achieved if the resistors connected in series have different resistance values. The differences from one resistor to the next that result over the entire switching range of the circuit element are therefore different. For example, if the circuit element is used to control the speed of travel, the differences between resistances in the switching range can be graduated in smaller intervals for a low speed of travel than in the switching range for a high speed of travel. This measure results in a precision control capability in the low speed range.

The contact points are preferably all located on one circuit board. In one advantageous refinement of the invention, the contact points can be connected by means of the contact membrane with an additional contact area which is located on the same circuit board. Located on the circuit board is a contact area that is connected with a specified contact point by means of the contact membrane in the manner described above. All of the connections for lines leading outward from the circuit element can thus be located directly on the circuit board. The contact membrane preferably does not have any connections for electrical lines.

It is preferable if there is a first movable slider, by means of which the pressure force can be applied to the contact membrane. The movable slider is movable over the contact membrane when the circuit element is actuated, as a result of which the location at which the slider presses on the contact membrane changes. No electric current thereby flows through the slider, so that there is practically no wear of the slider.

It is likewise preferable if there is a second slider that exerts a pressure force on the contact membrane, as a result of which the contact membrane can be connected with the contact area.

It is particularly advantageous if the movement of the first slider is mechanically coupled to the movement of the second slider. The movement of the sliders over the contact surface in the same direction is thus guaranteed. It consequently becomes possible to prevent undesirable fluctuations in the total resistance of the circuit element.

There are particular advantages if the pressure force of the slider on the contact membrane can be generated by means of a spring force, such as a coil or leaf spring pressing downwardly on the sliders, whereby the magnitude of the pressure force is independent of the position of the slider on the contact membrane. The pressure force of the slider should thereby be adjusted so that an electrical connection between the contact membrane with the contact area or the respective contact area is guaranteed, and so that at the same time there is no mechanical wear of the signal generator.

In one particularly appropriate refinement of the invention, at least some of the contact points have different dimensions in the direction of movement of the slider. As a result of the different widths of the contact points, the required actuation distance of the circuit element between two switching stages can be of different lengths. For example, if the circuit element is used to control the speed of travel, the widths of the contact points in the switching range for low speeds of travel can be wider than in the switching range for a high speed of travel. This measure makes possible a precision control capability in the slow speed range.

It is particularly advantageous if the circuit element can be used to generate a two-channel control signal. A two-channel capability of the control signal achieves a significant increase in safety, in particular on a circuit element used to control a lifting device.

In an additional embodiment of the invention, there is at least one additional contact point that does not have any connection to the other contact points that are connected to one another by means of resistors. This additional contact point is only connected to the contact membrane when the circuit element is in the neutral position. The neutral position can thereby be detected by means of a separate electrical circuit, which achieves a two-channel capability of the circuit element.

BRIEF DESCRIPTION OF THE DRAWINGS

Additional advantages and details of the invention are explained below, with reference to the embodiment illustrated in the drawing figures.

DESCRIPTION OF THE PREFERRED EMBODIMENTS

Figure 1A:
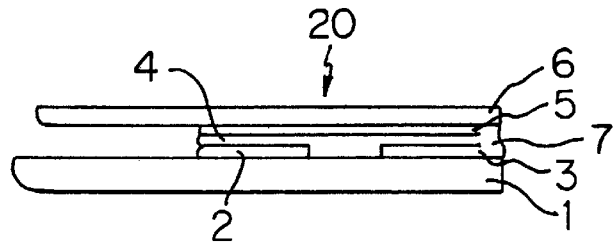
FIGS. 1A and 1B are end views of a circuit element of a control device of the invention in non-actuated and actuated positions, respectively.

FIG. 1A shows an end view of a circuit element of the invention in an non-actuated state. The circuit element 20 includes an essentially rigid circuit board 1 having a plurality of contact points 2, which in this view are concealing one another, and a contact area 3. Above the contact points 2 and the contact area 3 there is a contact membrane 6 which is separated from the contact points 2 and the contact area 3 by an air gap 4. The contact membrane 6 has an electrically conducting layer 5. The air gap 4 is formed by a spacer 7 which is preferably formed by a membrane located between the circuit board 1 and the contact membrane 6. In the non-actuated state, the contact points 2 are electrically isolated from the contact area 3.

Figure 1B:
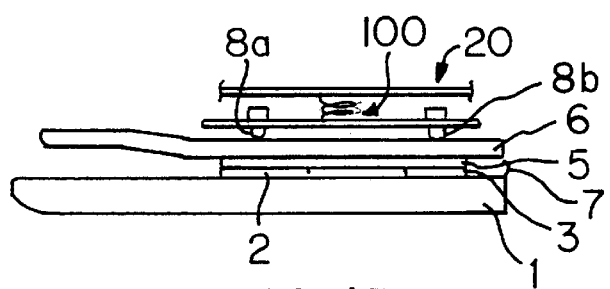

FIG. 1B shows the circuit element 20 in the actuated state. A first slider 8a exerts a pressure force on the contact membrane 6 in the vicinity of a contact point 2. At the same time, a second slider 8b presses on the contact membrane 6 in the vicinity of the contact area 3. The conducting layer 5 of the contact membrane 6 is thereby connected with the contact area 3 and, regardless of the position of the slider 8a, with the specified contact point 2. The air gap between the circuit board 1 and the contact membrane 6 can thereby be bridged by an elastic compression of the spacer 7, as illustrated in FIG. 1B. Preferably, however, the spacer 7 is made of inelastic material. In that case, the air gap can then be bridged by the elastic deformation of the contact membrane 6 in the vicinity of the sliders 8a, b. In the arrangement described above, no current flows through the sliders 8a, b. The sliders 8a, b press with a constant force on the contact membrane 6, regardless of the position of the circuit element.

Figure 2B:
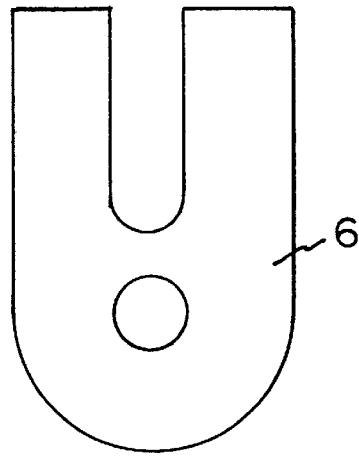
FIG. 2B is a plan view of a contact membrane of the invention.
Figure 2A:
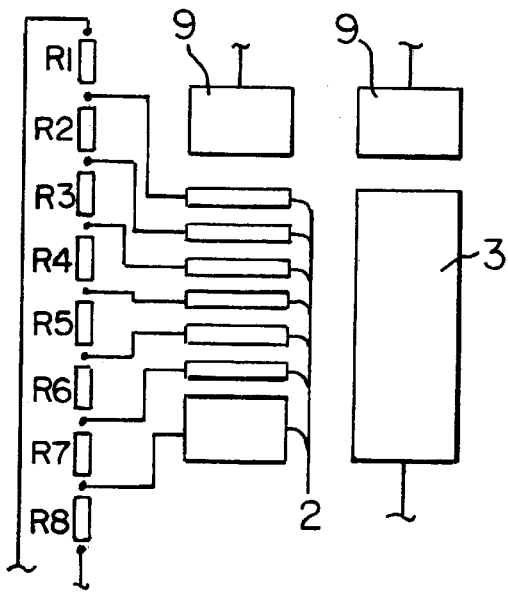
FIG. 2A is a plan view of a circuit board of the invention.

The locations of the contact points 2 and of the contact area 3 on the circuit board 1 are illustrated in FIG. 2A. The figure also shows the arrangement of the invention of a row of resistors R1 to R8, whereby each contact point 2 is connected with a connecting line of two resistors. The distances between the contact points 2 are formed with sufficient width so that when the circuit element 20 is actuated, at least one contact point 2 is connected to the contact membrane 6 at all times. The bottom contact point 2 illustrated in FIG. 2A, above which the slider 8a is located when the circuit element is actuated in the limit position, is shown to be wider than the other contact points 2. It is thereby guaranteed that when the circuit element 20 is actuated in the limit position, the slider 8a can in no case be moved beyond the lowest contact point 2 illustrated in the drawing.

As shown in FIG. 2A, above each of the contact points 2 and the contact area 3, there is an additional contact point 9. The contact points 9 can be connected to one another by means of the sliders 8a, b over the contact membrane 6 when the circuit element 20 is in the neutral position. By means of the additional contact points 9, the neutral position of the circuit element 20 can be detected by means of a separate electrical circuit (not shown), which meets the requirements for a two-channel signal processing.

FIG. 2B shows the contact membrane 6 in an overhead view. On its underside, the contact membrane 6 is completely covered with the electrically conducting coating 5.

Figure 2C:
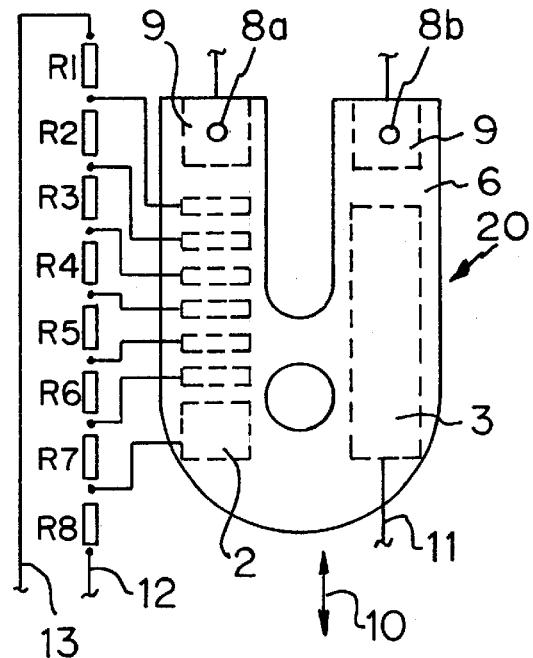
FIG. 2C is a plan, schematic view of a circuit element of the invention.

FIG. 2C shows the location of the contact membrane 6 when assembled, i.e., above the contact points 2, 9 and the contact area 3. The sliders 8a, b are shown in the neutral position of the circuit element 20. When the circuit element 20 is actuated, the sliders 8a, b are moved parallel to one another in the direction of arrow 10.

A maximum of two neighboring contact points 2 in series are thereby connected to the contact area 3 simultaneously. The electrical resistance between the connection 11 and the connections 12 and 13 thus changes stepwise with the movement of the slider 8a over the contact membrane 6, whereby a position of the slider 8a in which two neighboring contact points 2 are connected with the contact membrane 6 represents an intermediate stage with regard to the resistance. The overall resistance, which changes stepwise, can be used for the generation of a stepped control signal, e.g. to control the travel of the vehicle or to control a lifting device.

It will readily be appreciated by those skilled in the art that modifications may be made to the invention without departing from the concepts disclosed in the foregoing description. Such modifications are to be considered as included within the scope of the following claims unless the claims, by their language, expressly state otherwise. Accordingly, the particular embodiments described in detail hereinabove are illustrative only and are not limiting as to the scope of the invention, which is to be given the full breadth of the appended claims and any and all equivalents thereof.

We claim:

1. A control device for controlling a function of an industrial truck, the control device comprising:
    a circuit element configured to generate a multi-stage electrical control signal for controlling a function of an industrial truck, the circuit element including:
        a substrate;
        a plurality of spaced contact points located on the substrate;
        a contact area located on the substrate and spaced from the plurality of contact points;
        a contact membrane spaced from the substrate and facing the contact points and contact area;

a first slider movable over the contact membrane and configured to apply a pressure force to press the contact membrane against at least one contact point;

a second slider movable over the contact membrane and configured to apply a pressure force to press the contact membrane against the contact area to electrically connect the at least contact point with the contact area, wherein the contact points are connected by electrical resistors; and means for pressing the first and second sliders against the contact membrane such that the magnitude of the pressure force exerted on the contact membrane by the first and second sliders is independent of the position of the sliders on the contact membrane.

2. The control device as claimed in claim 1, wherein the electrical resistors are connected in series, and wherein a connecting line between two resistors is connected with a contact point.

3. The control device as claimed in claim 2, wherein each of the resistors connected in series has the same resistance value.

4. The control device as claimed in claim 3, wherein the contact points are all located on a circuit board.

5. The control device as claimed in claim 2, wherein the resistors connected in series have different resistance values.

6. The control device as claimed in claim 2, wherein the contact points are all located on a circuit board.

7. The control device as claimed in claim 1, wherein the contact points are all located on a circuit board.

8. The control device as claimed in claim 7, wherein the contact points are connectable by the contact membrane with the contact area located on the circuit board.

9. The control device as claimed in claim 1, wherein the first slider is mechanically coupled to the second slider.

10. The control device as claimed in claim 1, wherein the pressure force of the slider on the contact membrane is generated by a spring force.

11. The control device as claimed in claim 1, wherein at least one of the contact points has a different dimension in a direction of movement of the slider than the other contact points.

12. The control device as claimed in claim 1, wherein the circuit element is configured to generate a two-channel control signal.

13. The control device as claimed in claim 1, including at least one additional contact point which is not connected to the other contact points connected to one another by the resistors.

14. A control device for controlling a function of an industrial truck, the control device comprising:

a circuit element configured to generate an electrical control signal for controlling a function of an industrial truck, the circuit element including:
  a circuit board having a plurality of contact points, wherein the contact points are connected by at least one resistor;
  a contact area located on the circuit board and spaced from the plurality of contact points;
  at least one contact membrane having an electrically conducting layer connectable with at least one of the plurality of contact points and the contact area, the contact membrane spaced from the circuit board with the electrically conducting layer facing the contact points and contact area;
  a first slider movable along the contact membrane adjacent the contact points;
  a second slider movable along the contact membrane adjacent the contact area, wherein the first and second sliders are configured to exert a pressure on the contact membrane to electrically connect at least one of the contact points adjacent the first slider with the contact area adjacent the second slider through the electrically conducting layer; and
  means for pressing the first and second sliders against the contact membrane such that the magnitude of the pressure forces exerted on the contact membrane by the first and second sliders is independent of the position of the sliders on the contact membrane.

15. A control device for controlling a function of an industrial truck, the control device comprising:

a circuit element configured to generate a multi-stag electrical control signal for controlling a function of an industrial truck, the circuit element including:
  a circuit board having a plurality of spaced contact points, wherein the contact points are connected by at least one resistor;
  a contact area located on the circuit board and spaced from the plurality of contact points;
  a deformable contact member having a first side and a second side, with an electrically conducting layer located on the second side, the contact layer spaced from the circuit board facing the contact points and the contact area;
  a first slider movable along the first side of the contact membrane and configured to exert a pressure force to press a portion of the contact layer against at least one contact point;
  a second slider connected to the first slider and movable along the first side of the contact membrane and configured to exert a pressure force to press a portion of the contact layer against the contact area to electrically connect the at least one contact point adjacent the first slider with the contact area adjacent the second slider through the electrically conducting layer such that an overall electrical resistance of the circuit element changes stepwise with movement of the sliders over the contact membrane; and
means for pressing the first and second sliders against the contact membrane such that the magnitude of the pressure forces exerted on the contact membrane by the first and second sliders is independent of the position of the sliders on the contact membrane.

* * * * *